(12) United States Patent
Walker

(10) Patent No.: US 7,759,448 B2
(45) Date of Patent: Jul. 20, 2010

(54) SIMPLIFIED METHOD FOR PRODUCTION OF PHENOLIC RESOLE RESIN WITH HIGH MOLECULAR WEIGHT FRACTION

(75) Inventor: Terence B. Walker, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 914 days.

(21) Appl. No.: 11/544,044

(22) Filed: Oct. 6, 2006

(65) Prior Publication Data

US 2008/0085991 A1  Apr. 10, 2008

(51) Int. Cl.
*C08G 14/12* (2006.01)
*C08G 14/04* (2006.01)

(52) U.S. Cl. .................. 528/137; 528/129; 528/501; 528/502 R; 528/503

(58) Field of Classification Search .................. 528/129, 528/137, 501, 502 R, 503
See application file for complete search history.

(56) References Cited

U.S. PATENT DOCUMENTS

| | | | |
|---|---|---|---|
| 5,340,888 A | * | 8/1994 | Lemon et al. ............... 525/501 |
| 5,871,844 A | | 2/1999 | Theys et al. |
| 6,361,722 B1 | | 3/2002 | Theys et al. |
| 6,465,100 B1 | | 10/2002 | Johnson, III et al. |
| 6,676,887 B2 | | 1/2004 | Lafdi |
| 7,001,544 B2 | | 2/2006 | Shin et al. |
| 2002/0106514 A1 | | 8/2002 | Lafdi |
| 2003/0214064 A1 | | 11/2003 | Shin et al. |
| 2005/0266203 A1 | | 12/2005 | La Forest et al. |
| 2005/0271876 A1 | | 12/2005 | Walker et al. |

* cited by examiner

*Primary Examiner*—Duc Truong
(74) *Attorney, Agent, or Firm*—Birch, Stewart, Kolasch & Birch, LLP

(57) ABSTRACT

Process including steps (a.) through (c.). Step (a.) involves providing a mixture of 41-47 parts by weight phenol component and 54-58 parts by weight formaldehyde. The phenol component in this step is approximately ⅓ by weight para-phenylphenol and ⅔ by weight phenol. Step (b.) involves adding 2-12 parts by weight previously manufactured phenolic resole resin to the mixture formed in step (a.). Step (c.) involves allowing the resulting mixture of phenol, formaldehyde, and phenolic resole resin to react, thereby producing a phenolic resin having a high molecular weight fraction of at least 10 weight-percent. Also, phenolic resole resin made by the process of described herein. Such phenolic resole resin has an average molecular weight that is at least 10% lower and a viscosity that is at least 10% lower than a comparable phenolic resole resin made by carrying out steps (a.) and (c.) in the absence of step (b.) as described herein.

6 Claims, No Drawings

SIMPLIFIED METHOD FOR PRODUCTION OF PHENOLIC RESOLE RESIN WITH HIGH MOLECULAR WEIGHT FRACTION

FIELD OF THE INVENTION

This invention relates to the manufacture of phenolic resole resins that are especially suited for use in the manufacture of carbon-carbon composite friction materials.

BACKGROUND OF THE INVENTION

Phenolic resole resin is used in the production of carbon-carbon composites intended for use in the manufacture of aircraft brake discs. Phenolic resins are used to produce molded carbon fiber preforms that will ultimately be carbonized and further densified and finally machined into the end product brake discs. Phenolic resins may also be used as reimpregnation resins after the initial carbonization of the preforms.

Phenolic resins are formed by reaction between phenol and formaldehyde. This is a condensation reaction, which releases water ($H_2O$) as a byproduct. This condensation reaction proceeds by involving more and more phenol molecules. The resinous reaction product passes though a rubbery, thermoplastic state that is only partially soluble—this is called the B-stage. The C-stage occurs when the resin is cured and cross-linked to form a thermoset product. If the phenol/formaldehyde reaction is carried out in excess phenol with an acid catalyst, the reaction product is called a novolac resin. If the phenol/formaldehyde reaction is carried out in excess formaldehyde with a basic catalyst, the reaction product, at a low molecular weight stage, is called a resole resin.

In producing carbon-carbon composites, carbon fiber-reinforced phenolics are charred (pyrolyzed). This charring process results in a porous structure, because the phenolic ablates from solid to gas and does not go into a liquid phase. The resulting porous material is impregnated with pitch, phenolic resins, or directly with carbon by vapor deposition, and the resulting material is carefully charred again. This process is normally repeated several times until the voids in the composite are filled with carbon material. The process can take as long as 6 months, due to the need to prevent matrix damage.

Phenolic resole resins that contain a significant fraction of high molecular weight materials have been found to have improved resistance to cracking during processing. Phenolic resole resins with the appropriate fraction of high molecular weight materials have conventionally been made by extending the staging (or polymerization) step in the production of the phenolic resole resin. This approach increases the overall resin manufacturing process by several hours, and results in a very viscous resin component with a very high average molecular weight (undesirable characteristics) as well as the desired high molecular weight fraction.

SUMMARY OF THE INVENTION

The present invention eliminates much of that increase in processing time, and additionally provides the desired high molecular weight fraction in a phenolic resole resin having a lower average molecular weight and lower viscosity.

This invention provides a process of making a phenolic resole resin. The process of this invention includes steps (a.) through (c.). Step (a.) involves providing a mixture of 41-47 parts by weight phenol component and 54-58 parts by weight formaldehyde. The phenol component in this step is approximately ⅓ by weight para-phenylphenol and ⅔ by weight phenol. Step (b.) involves adding 2-12 parts by weight previously manufactured phenolic resole resin to the mixture formed in step (a.). Step (c.) involves allowing the resulting mixture of phenol, formaldehyde, and phenolic resole resin to react, thereby producing a phenolic resin having a high molecular weight fraction of at least 10 weight-percent.

In some embodiments of this invention, the mixture prepared in step (a.) may comprise 11-18 weight-% para-phenylphenol, 23-36 weight-% phenol, and 54-58 weight-% formaldehyde, and 5 parts by weight of previously manufactured phenolic resole resin may be added to 100 parts by weight of phenol/formaldehyde mixture in step (b.).

In other embodiments, the process of this invention contemplates sequentially: (a.) adding all of the previously manufactured high molecular weight fraction phenolic resin to approximately half of the phenolic component in a reaction vessel; (b.) reacting approximately half of the formaldehyde component therewith at a temperature of about 125-150° C. for about ½ to 2 hours; and then (c.) adding the remaining phenol component and the remaining formaldehyde component to the reaction mixture formed in step (b.). In this invention, the reaction vessel may be subjected to vacuum dewatering.

The process of this invention permits carrying out reaction step (c.) for a period of time that is just 10% of the period of time that would be necessary to produce a phenolic resole resin having a comparable high molecular weight fraction by carrying out steps (a.) and (c.) in the absence of step (b.). Thus, as noted above, the present invention eliminates much of the increase in processing time involved in conventional processing. Additionally, the present invention provides high molecular weight fraction in a phenolic resole resin having a lower average molecular weight and lower viscosity.

Another embodiment of the present invention is a phenolic resole resin made by the process of described herein. Such phenolic resole resin will have an average molecular weight that is at least 10% lower and a viscosity that is at least 10% lower than a comparable phenolic resole resin made by carrying out steps (a.) and (c.) in the absence of step (b.) as described herein.

DETAILED DESCRIPTION OF THE INVENTION

Phenolic resole resins are frequently analyzed using gel permeation chromatography or GPC. GPC uses a column of especially treated silica to separate complex mixtures (such as phenolic resins) into their respective components, generally separating them by molecular weight. The resin is solvated, passed through the column and the elution of the components is measured using various types of detectors. With phenolic resins, higher molecular weight fractions move through the column faster, and very high molecular weight fractions will move especially quickly, forming a "high molecular weight tail", or "hump" in the resulting GPC spectra.

For phenolic resins described herein, terpolymer of phenol, para-phenyl phenol, and formaldehyde, the presence of the so-called "tail" is an excellent predictor of good processability for composites made with the resin. In particular, the presence of the higher molecular weight fraction significantly reduced the tendency of composite parts—such as aircraft landing system brake discs, produced from the resin to delaminate or crack during composite processing. In standard production processing, the high molecular weight fraction is produced by extending the reaction process or "cook time" by as much as several hours.

In the process of making phenolic resoles, formaldehyde substituted or partially reacted phenols tend to react more quickly than unreacted phenol. It has been discovered that by adding a small fraction of finished resin to the initial ingredients, the reaction is "seeded" with higher molecular weight components, which, being more reactive, generate very high molecular weight oligomers more quickly and in greater numbers than unreacted raw ingredients.

EXAMPLE

A phenolic resin is formulated as follows:
15 parts by weight para-phenylphenol
30 parts by weight phenol
56 parts by weight formaldehyde in the form of solid para-formaldehyde
5 parts by weight previously manufactured resin based on 15/30/56 formula.

The resin is produced by dissolving the para-phenylphenol in a mixture made up of 50% of the phenol component (that is, the phenol and para-phenylphenol) and 100% of the previously manufactured resin at a temperature of approximately 125-150° C. 50% of the formaldehyde is added to the mixture and allowed to react with the phenol species at 125-150° C. for a time period of approximately an hour. At this point, the remaining phenol component is added, along with the remaining formaldehyde, and the material is reacted to the desired viscosity end-point using conventional processing techniques, including vacuum de-watering of the reaction vessel. The resin produced in this fashion reaches the appropriate viscosity in less time then analogous resin made entirely by the conventional method. Also, the resin produced in this fashion contains a higher fraction of very high molecular weight oligomers than does resin made entirely by using the conventional method.

The present invention has been described herein in terms of a preferred embodiment. However, obvious modifications and additions to the invention will become apparent to those skilled in the relevant arts upon a reading and understanding of the foregoing description. It is intended that all such modifications and additions form a part of the present invention to the extent that they fall within the scope of the several claims appended hereto.

The invention claimed is:

1. A process of making a phenolic resole resin which comprises the steps of:
   providing a mixture of 41-47 parts by weight phenol component and 54-58 parts by weight formaldehyde, wherein said phenol component is approximately ⅓ by weight para-phenylphenol and ⅔ by weight phenol;
   adding 2-12 parts by weight previously manufactured phenolic resole resin to said mixture; and
   allowing the resulting mixture of phenol, formaldehyde, and phenolic resole resin to react, thereby producing a phenolic resin having a high molecular weight fraction of at least 10 weight-%.

2. The process of claim 1, wherein the mixture of phenol component and formaldehyde comprises 11-18 weight-% para-phenylphenol, 23-36 weight-% phenol, and 54-58 weight-% formaldehyde.

3. The process of claim 1, wherein 5 parts by weight of previously manufactured phenolic resole resin are added to 100 parts by weight of phenol/formaldehyde mixture in the step of adding previously manufactured phenolic resole resin to the mixture.

4. A process of making a phenolic resole resin which comprises the sequential steps of:
   providing a mixture of 41-47 parts by weight phenol component and 54-58 parts by weight formaldehyde, wherein said phenol component is approximately ⅓ by weight para-phenylphenol and ⅔ by weight phenol;
   providing 2-12 parts by weight previously manufactured phenolic resole resin;
   adding all of said previously manufactured high molecular weight fraction phenolic resin to approximately half of the phenol component in a reaction vessel;
   reacting approximately half of the formaldehyde component therewith at a temperature of about 125-150° C. for about ½ to 2 hours;
   adding the remaining phenol component and the remaining formaldehyde component to the reaction mixture formed by reacting approximately half of the formaldehyde component with the reaction product of approximately half of the phenol component with all of the previously manufactured high molecular weight fraction phenolic resin; and
   allowing the resulting mixture of phenol, formaldehyde, and phenolic resole resin to react, thereby producing a phenolic resin having a high molecular weight fraction of at least 10 weight-%.

5. The process of claim 4, wherein the reaction vessel is subjected to vacuum dewatering.

6. The process of claim 1, wherein the step of allowing the resulting mixture of phenol, formaldehyde, and phenolic resole resin to react is carried out for a period of time that is 10% of the period of time that would be necessary to produce a phenolic resole resin having a comparable high molecular weight fraction by the steps of:
   providing a mixture of 41-47 parts by weight phenol component and 54-58 parts by weight formaldehyde, wherein said phenol component is approximately ⅓ by weight para-phenylphenol and ⅔ by weight phenol; and
   allowing the resulting mixture of phenol and formaldehyde resin to react, thereby producing a phenolic resin having a high molecular weight fraction of at least 10 weight-%.

* * * * *